United States Patent
Ueda

(10) Patent No.: US 10,948,960 B2
(45) Date of Patent: Mar. 16, 2021

(54) CONTROL DEVICE AND CONTROL METHOD

(71) Applicant: OMRON Corporation, Kyoto (JP)

(72) Inventor: Hiroaki Ueda, Kyoto (JP)

(73) Assignee: OMRON Corporation, Kyoto (JP)

(*) Notice: Subject to any disclaimer, the term of this patent is extended or adjusted under 35 U.S.C. 154(b) by 88 days.

(21) Appl. No.: 16/274,238

(22) Filed: Feb. 13, 2019

(65) Prior Publication Data
US 2019/0286203 A1  Sep. 19, 2019

(30) Foreign Application Priority Data
Mar. 15, 2018 (JP) .............................. JP2018-047472

(51) Int. Cl.
| | | |
|---|---|---|
| *G06F 1/26* | (2006.01) | |
| *G05B 19/05* | (2006.01) | |
| *G05F 1/46* | (2006.01) | |
| *G06F 1/28* | (2006.01) | |
| *G06F 1/30* | (2006.01) | |

(52) U.S. Cl.
CPC ............. *G06F 1/263* (2013.01); *G05B 19/05* (2013.01); *G05B 19/058* (2013.01); *G05F 1/46* (2013.01); *G06F 1/28* (2013.01); *G06F 1/30* (2013.01)

(58) Field of Classification Search
CPC ... G06F 1/263; G06F 1/28; G06F 1/30; G05B 19/05; G05B 19/058; G05F 1/46
See application file for complete search history.

(56) References Cited

U.S. PATENT DOCUMENTS

| | | | |
|---|---|---|---|
| 6,601,181 B1 | 7/2003 | Thomas | |
| 8,161,310 B2* | 4/2012 | Cagno | ................ G11C 5/141 |
| | | | 713/340 |
| 9,328,711 B2* | 5/2016 | Uchida | ............... F02N 11/0866 |
| 2003/0109243 A1* | 6/2003 | Chang | ....................... G06F 1/30 |
| | | | 455/343.1 |

(Continued)

FOREIGN PATENT DOCUMENTS

| | | |
|---|---|---|
| EP | 3159755 | 4/2017 |
| JP | 2014160377 | 9/2014 |

OTHER PUBLICATIONS

"Search Report of Europe Counterpart Application", dated Jul. 18, 2019, pp. 1-9.

*Primary Examiner* — Aurel Prifti
(74) *Attorney, Agent, or Firm* — JCIPRNET

(57) ABSTRACT

The disclosure provides a control device and a control method capable of properly executing a termination process even in a case where a power shutdown occurs again during the execution of a restart process. A programmable logic controller includes a central processing unit module, a power shutdown detection part, a power supply holding circuit, and a power detection part. The central processing unit module executes the termination process with the power supplied from the power supply holding circuit in a case where the power shutdown detection part has detected the power shutdown, and the central processing unit module executes a reboot process on condition that the power supply holding circuit holds a power amount equal to or greater than a reference amount based on the power detection part in a case where the power shutdown detection part has detected a return of the power supply from the power shutdown.

5 Claims, 6 Drawing Sheets

(56) References Cited

U.S. PATENT DOCUMENTS

| | | | |
|---|---|---|---|
| 2007/0033431 A1* | 2/2007 | Pecone | G06F 11/3058 714/6.12 |
| 2009/0146828 A1* | 6/2009 | Eschelbacher | B66D 1/54 340/679 |
| 2009/0172469 A1* | 7/2009 | Xiao | G06F 13/4027 714/14 |
| 2010/0080057 A1* | 4/2010 | Reuter | G11C 5/141 365/185.04 |
| 2010/0146333 A1* | 6/2010 | Yong | G06F 1/305 714/14 |
| 2010/0226170 A1* | 9/2010 | Lin | G11C 5/144 365/185.03 |
| 2010/0226194 A1* | 9/2010 | Huang | G11C 16/22 365/229 |
| 2010/0299558 A1* | 11/2010 | Tojo | G06F 21/805 714/14 |
| 2010/0332896 A1* | 12/2010 | Wilson | G06F 1/30 714/14 |
| 2011/0066872 A1* | 3/2011 | Miller | G06F 1/30 713/340 |
| 2011/0080422 A1* | 4/2011 | Lee | G06F 1/3203 345/589 |
| 2012/0131253 A1* | 5/2012 | McKnight | G06F 13/385 710/308 |
| 2012/0246503 A1* | 9/2012 | Fujisaki | G06F 1/28 713/323 |
| 2013/0111104 A1* | 5/2013 | Kim | G06F 11/1441 711/103 |
| 2014/0068310 A1* | 3/2014 | Sultenfuss | G06F 1/30 713/340 |
| 2014/0176046 A1* | 6/2014 | Park | H02J 7/0024 320/103 |
| 2014/0184897 A1* | 7/2014 | Degura | H04N 5/23241 348/372 |
| 2015/0207361 A1* | 7/2015 | Jung | H02J 7/0063 713/300 |
| 2015/0358695 A1* | 12/2015 | McGoogan | G01D 9/00 340/870.39 |
| 2016/0011887 A1* | 1/2016 | Chung | G06F 1/266 713/2 |
| 2016/0111880 A1* | 4/2016 | Terai | G06F 1/30 700/287 |
| 2016/0246345 A1* | 8/2016 | Johnston | G06F 1/26 |
| 2017/0067968 A1* | 3/2017 | Lee | G01R 31/386 |
| 2017/0111048 A1* | 4/2017 | Lee | G11C 5/14 |
| 2018/0067530 A1* | 3/2018 | Hsieh | G06F 13/4068 |
| 2018/0308527 A1* | 10/2018 | Narayanan | G06F 3/065 |
| 2019/0332154 A1* | 10/2019 | Thompson | G06F 1/24 |

* cited by examiner

CONTROL DEVICE AND CONTROL METHOD

CROSS-REFERENCE TO RELATED APPLICATION

This application claims the priority benefit of Japan application serial no. 2018-047472, filed on Mar. 15, 2018. The entirety of the above-mentioned patent application is hereby incorporated by reference herein and made a part of this specification.

BACKGROUND

Technical Field

The disclosure relates to a control device and a control method for controlling facilities or machines.

Description of Related Art

A PLC (a Programmable Logic Controller, also called a programmable controller) is one of the control devices used in FA (Factory Automation), etc. for controlling facilities or machines. In general, the PLC is configured to be able to back up data at the time of a power shutdown.

For example, a power supply switching part of the PLC disclosed in Japanese Patent Laid-open No. 2014-160377 (Patent Document 1) includes two power supply lines parallel to each other and commonly connected to a DC power supply. A DC/DC converter is connected to the first power supply line via a diode. The DC/DC converter steps down an input voltage (20-V to 28-V) to 3.3-V, which is the operating voltage of the main circuit, and outputs a constant voltage.

On the other hand, a capacitor is provided between the second power supply line and the ground as a power supply for the backup operation. The capacitor is connected to the input stage of the DC/DC converter via a switch. While the DC power supply is on, the switch is turned off, and the capacitor is disconnected from the DC/DC converter. When a power shutdown is detected, the switch is turned on, and the DC/DC converter generates a constant voltage for a certain period of time with the capacitor as the power supply source.

However, in Patent Document 1, in a case where the power supply is returned and a reboot (a restart process) is performed while the DC/DC converter generates a constant voltage for a certain period of time with the capacitor as the power supply source and the backup operation (a termination process) is being executed, the reboot is executed in a state where the power amount charged in the capacitor has decreased. For this reason, there is a problem that the backup operation cannot be properly executed by the power amount charged in the capacitor in a case where the power shutdown occurs again during the execution of the reboot.

SUMMARY

The disclosure provides a control device and a control method capable of properly executing the termination process (the backup operation) even in a case where the power shutdown occurs again during the execution of the restart process (the reboot). Other problems and advantageous effects will be described in the following solutions and embodiments for solving the problems.

A control device according to an example of the disclosure includes: a control part configured to control machines to be controlled; a power shutdown detection part configured to detect a power shutdown in which power supply from a power supply to the control part is cut off; a power supply holding part configured to supply power to the control part at the time of the power shutdown; and a power detection part configured to detect a power amount held in the power supply holding part, wherein the control part executes a termination process with the power supplied from the power supply holding part in a case where the power shutdown detection part has detected the power shutdown and executes a restart process on condition that the power supply holding part holds the power amount equal to or greater than a reference amount based on the power detection part in a case where the power shutdown detection part has detected a return of the power supply from the power shutdown. Therefore, in the control device, the termination process can be properly executed even in a case where the power shutdown occurs again during the restart process.

The control part sets a determination timing for whether to execute the restart process after a lapse of a certain period of time from a start of the termination process and determines the return of the power supply from the power shutdown and the power amount of the power supply holding part at the determination timing. Therefore, the control part can prevent a situation where the restart process is executed at an improper timing during the termination process.

The determination timing is set as a timing after at least a backup process in the termination process has been executed. Therefore, the control part can avoid a situation where the restart process is executed during the backup process and the data cannot be stored.

The reference amount is set based on a power amount necessary for executing the termination process. Therefore, even if the power shutdown occurs again when the restart process is executed, the control part can sufficiently charge the power supply holding part with the power amount necessary for the termination process.

According to another example of the disclosure, a control method of a control device—which includes: a control part configured to control machines to be controlled; a power shutdown detection part configured to detect a power shutdown in which power supply from a power supply to the control part is cut off; a power supply holding part configured to supply power to the control part at the time of the power shutdown; and a power detection part configured to detect a power amount held in the power supply holding part—includes a step of executing a termination process with the power supplied from the power supply holding part in a case where the power shutdown detection part has detected the power shutdown; and a step of executing a restart process on condition that the power supply holding part holds the power amount equal to or greater than a reference amount based on the power detection part in a case where the power shutdown detection part has detected a return of the power supply from the power shutdown. Therefore, in the control device, the termination process can be properly executed even in a case where the power shutdown occurs again during the restart process.

According to the control device and the control method of the disclosure, since the restart process is executed on condition that the power supply holding part holds the power amount equal to or greater than the reference amount based on the power detection part, the termination process can be executed properly even in a case where the power shutdown occurs again during the execution of the restart process.

DESCRIPTION OF THE EMBODIMENTS

Figure 1:
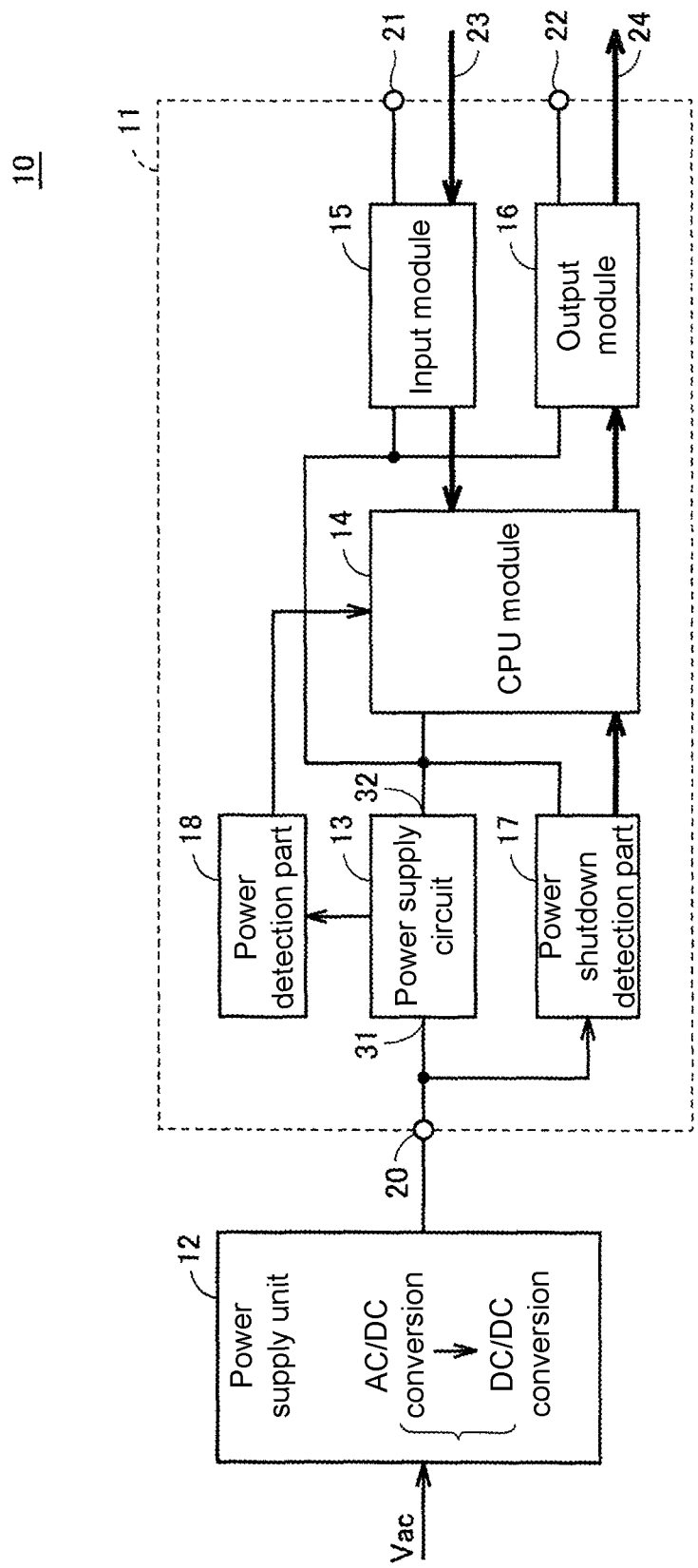
FIG. 1 is a block diagram showing an example of the overall configuration of the PLC.

Hereinafter, embodiments of the disclosure will be described in detail with reference to the drawings. In the drawings, the same reference numerals denote the same or corresponding parts.

(Applicable Example)

[Overall Configuration of the PLC]

In the present embodiment, a PLC as one of the control devices for controlling facilities or machines will be described. FIG. 1 is a block diagram showing an example of the overall configuration of the PLC. With reference to FIG. 1, the PLC 10 includes a PLC body 11 and a power supply unit 12. The power supply unit 12 converts an alternating current (AC) voltage input from the outside into a direct current (DC) voltage and further converts the direct current (DC) voltage to a direct current (DC) voltage of a predetermined voltage level as necessary and outputs it. A general-purpose power supply can be used as the power supply unit 12. The PLC 10 may be configured by further adding one or more input/output units (not shown).

The PLC body 11 includes a power supply circuit 13, a CPU (Central Processing Unit) module 14, an input module 15, an output module 16, a power shutdown detection part 17, a power detection part 18, and power supply terminals 20, 21 and 22.

A DC voltage is supplied from the power supply unit 12 to the power supply terminal 20. This DC voltage is supplied to the CPU module 14, the power shutdown detection part 17, the power detection part 18, a part of the input module 15, and a part of the output module 16 via the power supply circuit 13. The power supply circuit 13 can supply a drive voltage to the above-mentioned modules for a certain period of time after the power supply is cut off for performing a termination process including processes such as backing up data at the time of the power shutdown. Details of the power supply circuit 13 will be described in detail with reference to FIG. 2.

The input module 15 captures input data 23 indicating various data, etc. from one or more machines to be controlled. The output module 16 outputs output data 24 for controlling the machines to be controlled according to a command from the CPU module 14. A drive voltage is supplied from the power supply circuit 13 to a part of the circuits configuring the input module 15 and the output module 16, the part requiring the backup of data and protection of various peripheral devices at the time of the power shutdown. The other parts of the circuits of the input module 15 and the output module 16 are operated by DC voltages supplied via the power supply terminals 21 and 22, respectively.

The CPU module 14 performs calculation based on the input data 23 received via the input module 15 and outputs the output data 24 based on the calculation result via the output module 16. Therefore, the CPU module 14 is a control part configured to control one or more machines to be controlled.

The CPU module 14 is configured by a general microcomputer (also called a microcontroller, etc.) including a CPU, a RAM (Random Access Memory), a ROM (Read Only Memory), a nonvolatile memory, etc. The CPU is an arithmetic logic unit for executing various programs and interprets and executes instruction codes sequentially supplied from a system controller according to an internal clock. A plurality of CPUs may be implemented, or a plurality of arithmetic cores may be implemented in one single CPU. That is, it may be a so-called multiprocessor or a multicore processor. In some cases, the CPU module 14 may further include a circuit configured by ASIC (Application Specific Integrated Circuit), FPGA (Field Programmable Gate Array), etc.

The power shutdown detection part 17 monitors the voltage level of the DC voltage input from the power supply terminal 20 and outputs a signal (a power shutdown detection signal) for notifying the CPU module 14 of the power shutdown in a case where the voltage level of the input DC voltage has become less than a reference value. Upon receiving a notification of the power shutdown from the power shutdown detection part 17, the CPU module 14 executes a termination process including processes such as storing data indicating the state of the device immediately before the power shutdown, which is necessary when the power supply is returned from the power shutdown, in a built-in nonvolatile memory (not shown), etc. A capacitor is provided in the power supply circuit 13 as a power supply for allowing the CPU module 14, etc. to operate during the execution of the termination process.

The power detection part 18 monitors the power amount charged in the capacitors of the power supply circuit 13, and in a case where the power amount being charged is equal to or greater than a reference amount, information indicating that the charge completion detection flag is in the High state is output to the CPU module 14. The CPU module 14 does not execute the reboot process of returning the power supply from the power shutdown until receiving the charge completion detection flag in the High state. That is, in a case where the power amount of the capacitors of the power supply circuit 13 is less than the reference amount, the CPU module 14 does not execute the reboot process even if the power supply is returned. Here, the reference amount is set as the power amount necessary for the termination process.

[Configuration of the Power Supply Circuit]

Figure 2:
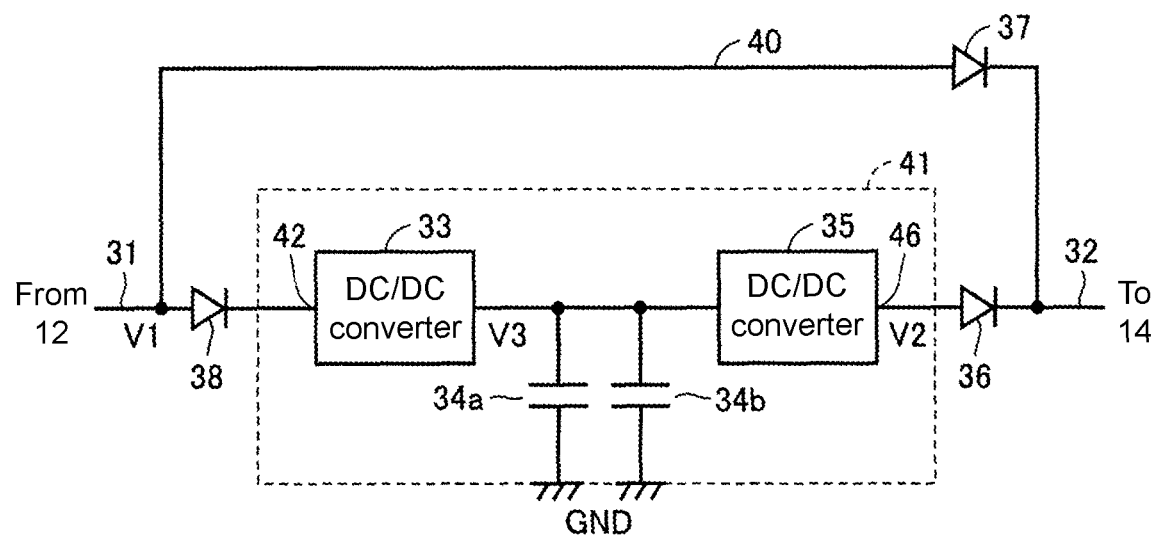
FIG. 2 is a block diagram showing a configuration of the power supply circuit of FIG. 1.

FIG. 2 is a block diagram showing a configuration of the power supply circuit of FIG. 1. With reference to FIG. 2, the power supply circuit 13 includes a voltage input node 31 as a first node, a voltage output node 32 as a second node, a wiring 40, DC/DC converters 33 and 35, capacitors 34a and 34b as charge parts, and diodes 36, 37 and 38 as rectifying elements.

The voltage input node 31 is connected to the power supply terminal 20 of FIG. 1, whereby the DC voltage of a voltage level V1 is input from the power supply unit 12. A DC voltage for driving the CPU module 14, etc. is output from the voltage output node 32.

The DC/DC converter 33 steps up the input voltage to a DC voltage of a voltage level V3 based on the DC voltage of the voltage level V1 input from the voltage input node 31 and outputs it. The type of the DC/DC converter 33 is not particularly limited. For example, a non-insulation type converter such as a step-up chopper may be used, or an insulation type converter such as a forward converter may be used.

The capacitors 34a and 34b are connected in parallel between the wiring, which connects the DC/DC converter 33 and the DC/DC converter 35, and the ground GND. The capacitors 34a and 34b are used as charge parts capable of charging with the output voltage of the DC/DC converter 33 and discharging the charged voltage. The discharge voltage of the capacitors 34a and 34b is input to the DC/DC converter 35. The reason why capacitors are used as backup power supplies is that capacitors are suitable for a PLC which is required to be compact and low-cost. Further, although the two capacitors 34a and 34b are connected in parallel to secure the necessary power amount, it may be configured by one capacitor if the necessary power amount can be secured, and more capacitors may be connected in parallel if more power amount has to be secured.

Although the types of the capacitors 34a and 34b are not particularly limited, it is necessary to select a capacitor capable of storing electric energy enough to supply power only for the time necessary for the data backup and protection of various peripheral devices at the time of the power shutdown. In the case of the configuration of the power supply circuit 13 in FIG. 2, more electric energy can be stored in the capacitors 34a and 34b by supplying a stepped-up voltage to the capacitors 34a and 34b by the DC/DC converter 33. Therefore, the capacitance of the capacitors 34a and 34b may be further reduced.

The DC/DC converter 35 converts the discharge voltage of the capacitors 34a and 34b into a DC voltage of a voltage level V2 lower than the voltage level V1 and outputs it. The type of the DC/DC converter 35 is not particularly limited. For example, a non-insulation type converter such as a step-down chopper may be used, or an insulation type converter such as a flyback converter may be used.

The DC/DC converter 33, the capacitors 34a and 34b, and the DC/DC converter 35 configure a power supply holding circuit 41. The power supply holding circuit 41 supplies the power for executing the termination process at the time of the power shutdown to the CPU module 14, etc. The power detection part 18 measures a power supply holding voltage of the power supply holding circuit 41 and compares the measured voltage with a reference voltage to detect whether the power amount charged in the capacitors 34a and 34b is equal to or greater than the reference amount or not.

The diode 36 is connected between an output node 46 of the DC/DC converter 35 and the voltage output node 32. The direction from the DC/DC converter 35 to the voltage output node 32 is the forward direction of the diode 36.

The diode 38 is connected between the voltage input node 31 and an input node 42 of the DC/DC converter 33. The direction from the voltage input node 31 to the DC/DC converter 33 is the forward direction of the diode 38. The diode 38 is provided to prevent the DC/DC converters 33 and 35, etc. from being damaged when a power supply unit of the opposite polarity is erroneously connected to the power supply terminal 20. Therefore, the diode 38 is not necessarily provided.

The wiring 40 is another current path connecting the voltage input node 31 and the voltage output node 32 in parallel to the current path passing through the diode 38, the DC/DC converter 33, the DC/DC converter 35, and the diode 36. The diode 37 is provided in the middle of the wiring 40. The direction from the voltage input node 31 to the voltage output node 32 is the forward direction of the diode 37.

In the configuration of the power supply circuit 13, the voltage level V1 of the DC voltage supplied from the power supply unit 12 is, for example, 24-V. The voltage level V3 of the output voltage of the DC/DC converter 33 is, for example, 50-V. The voltage level V2 of the output voltage of the DC/DC converter 35 is, for example, 14-V. In this case, if voltage drops in the diodes 36 and 37, the wirings, etc. are ignored, then the DC voltage of the voltage level V1 (24-V, for example) is input to the CPU module 14, etc. at a normal time, and the DC voltage of the voltage level V2 (14-V, for example) is input to the CPU module 14, etc. at the time of the power shutdown, as to be described later. Therefore, it is necessary for the CPU module 14, etc. to be operable within a range of the power supply voltage including the voltage levels V1 and V2.

If the PLC body 11 is connected via an interface conforming to the Peripheral Component Interconnect (PCI) Express (PCIe), and the voltage level V1 of the DC voltage supplied from the outside is, for example, 12-V, then it is necessary to convert the voltage level V1 of 12-V to the voltage level V3 of 50-V by the DC/DC converter 33.

[Operation at the Time of the Power Shutdown]

Figure 3:
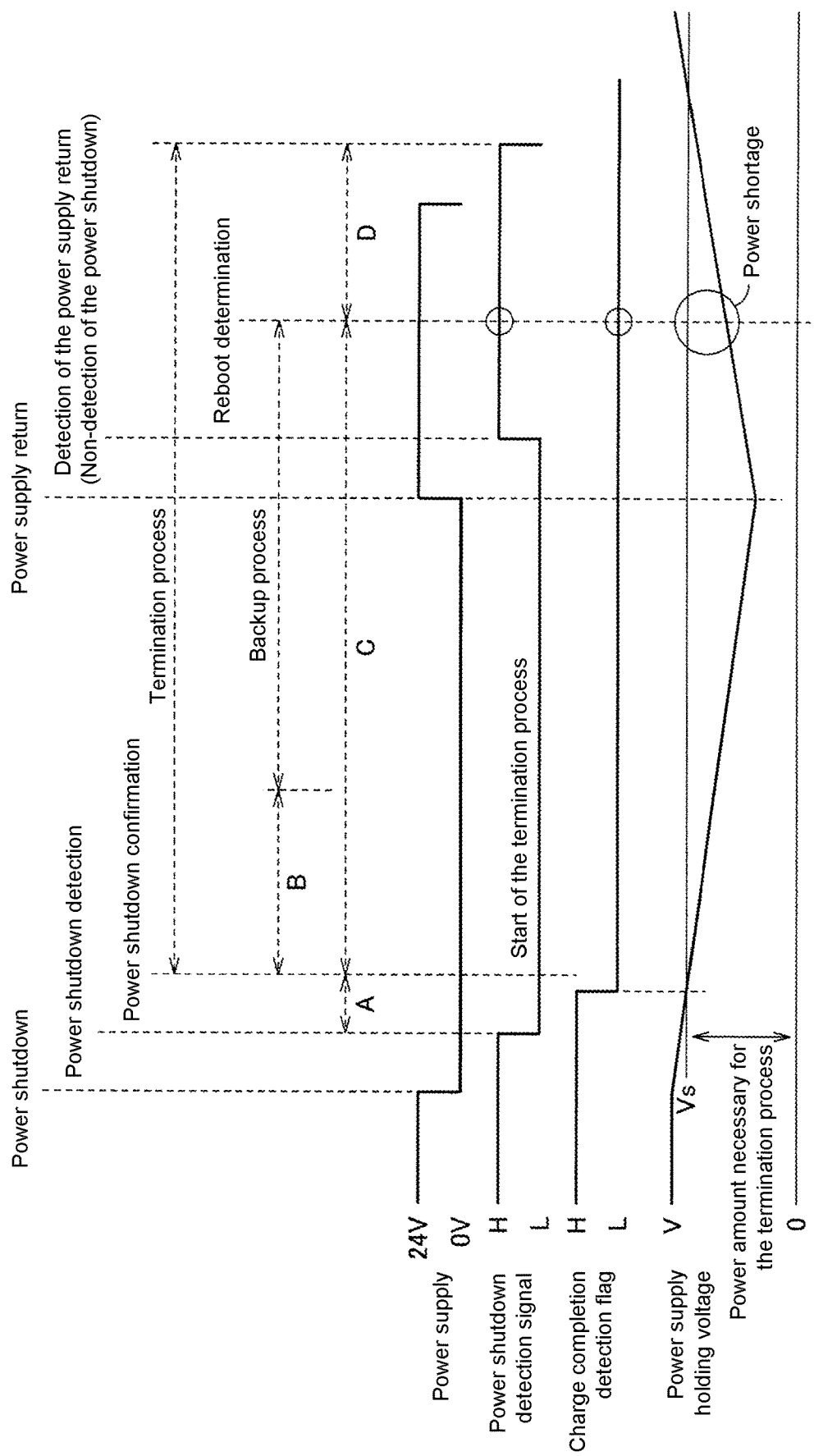
FIG. 3 is a timing chart for explaining a state of the PLC and the power supply circuit in a case where the reboot is not performed when the power supply is returned from the power shutdown.
Figure 4:
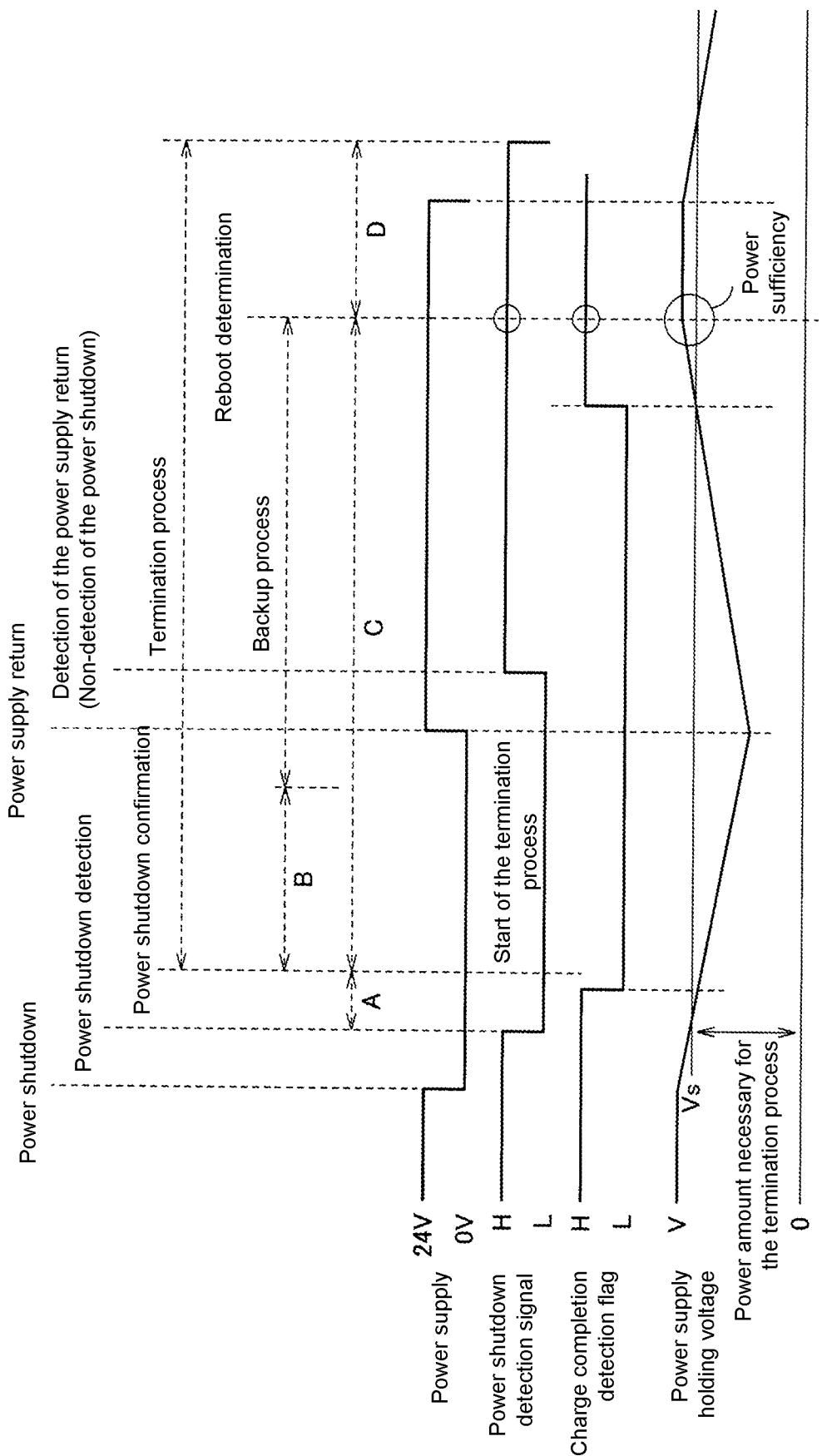
FIG. 4 is a timing chart for explaining a state of the PLC and the power supply circuit in a case where the reboot is performed when the power supply is returned from the power shutdown.

Next, the operation of the PLC 10 at the time of the power shutdown will be described. FIG. 3 is a timing chart for explaining a state of the PLC and the power supply circuit in a case where the reboot is not performed when the power supply is returned from the power shutdown. FIG. 4 is a timing chart for explaining a state of the PLC and the power supply circuit in a case where the reboot is performed when the power supply is returned from the power shutdown. First, the voltage level of the DC voltage supplied from the power supply unit 12 changes from 24-V to 0-V due to the occurrence of the power shutdown. The power shutdown detection part 17 detects the occurrence of the power shutdown by detecting that the voltage level of the DC voltage input from the power supply terminal 20 has become less than the reference value and outputs the power shutdown detection signal having changed from the High state to the Low state to the CPU module 14 to notify the power shutdown.

Due to the occurrence of the power shutdown, in the power supply circuit 13, the power supply from the power supply holding circuit 41 to the CPU module 14, etc. is started. Therefore, by supplying the power charged in the capacitors 34a and 34b to the CPU module 14, etc., the power supply holding voltage V of the power supply holding circuit 41 starts to decrease and keeps decreasing until the power supply is returned. At a timing when the power supply holding voltage V has become less than the reference voltage Vs corresponding to the power amount (the reference amount) necessary for the termination process, the power detection part 18 detects that the power amount charged in the capacitors 34a and 34b has become less than the reference amount. In a case where the power detection part 18 has detected that the power amount charged in the capacitors 34a and 34b has become less than the reference amount, the power detection part 18 changes the charge completion detection flag from the High state to the Low state and notifies the CPU module 14 of it.

The CPU module 14 starts the termination process after a lapse of a period A from the receipt of the power shutdown detection signal in the Low state. Further, the CPU module 14 executes a process of protecting various peripheral devices, etc. from the start of the termination process and starts a backup process for backing up the data at the time of the power shutdown after a period B.

When the power supply is returned during the execution of the termination process and the voltage level of the DC voltage supplied from the power supply unit 12 changes from 0-V to 24-V, the power shutdown detection part 17 detects a power supply return (non-detection of the power shutdown) by detecting that the voltage level of the DC voltage becomes equal to or greater than the reference value and outputs the power shutdown detection signal having changed from the Low state to the High state to the CPU module 14 to notify the power supply return.

Since the PLC 10 is a control device for controlling facilities or machines, the PLC 10 needs to continue the operation state as far as possible, and in a case where the power supply is returned during the termination process, the PLC 10 executes a reboot (restart) process. In FIG. 3, in a case where the power supply is returned during the execution of the termination process, a reboot determination is performed to determine whether to perform the reboot process at the timing after the backup process has been executed. In the reboot determination, the determination is performed based on whether the power shutdown detection signal is in the High state and whether the charge completion detection flag is in the High state.

Figure 5:
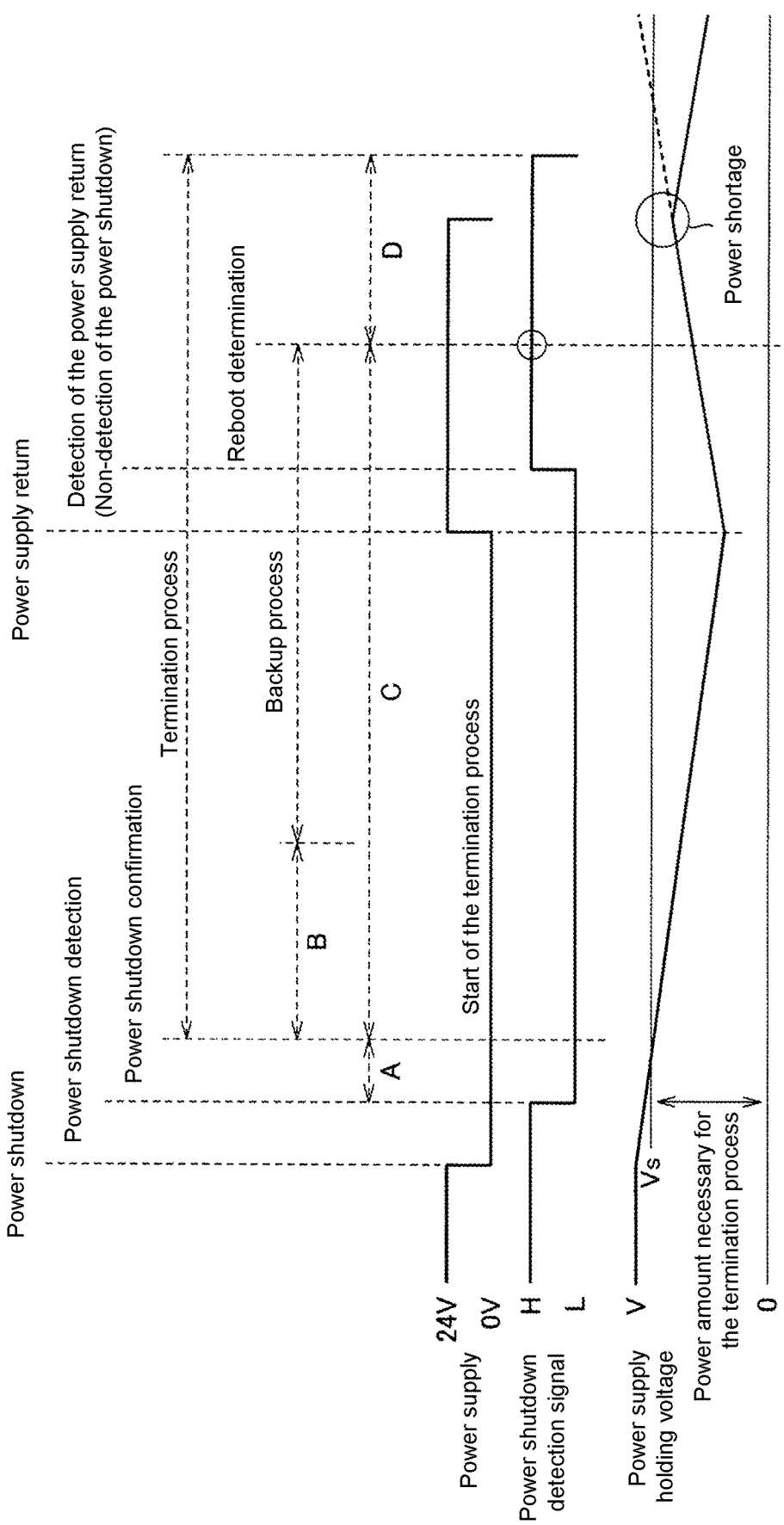
FIG. 5 is a timing chart for explaining a state of a PLC and a power supply circuit as a comparison object.

Before the reboot determination in the PLC 10 according to the present embodiment is described, a PLC which performs a reboot determination without considering the power amount of the capacitors will be described as a comparison object. FIG. 5 is a timing chart for explaining a state of a PLC and a power supply circuit as the comparison object. The PLC as the comparison object does not have a power detection part and starts the reboot process when the power shutdown detection signal is in the High state at the reboot determination timing without considering the power amount charged in the capacitors of the power supply holding circuit.

However, as shown in FIG. 5, since the power supply holding voltage V is less than the reference voltage Vs corresponding to the power amount (the reference amount) necessary for the termination process at the reboot determination timing, the power amount necessary for the termination process is not charged in the capacitors (a power shortage) if the power shutdown occurs again during the reboot process. For this reason, the termination process cannot be performed properly even if the termination process is executed when the power shutdown occurs again during the reboot process in the state of the power shortage, and there is a possibility that problems such as the data at the time of the power shutdown being unable to be stored and various peripheral devices being damaged may occur.

Therefore, in the PLC 10 according to the present embodiment, the power detection part 18 is provided, and the reboot determination is performed in consideration of the power amount of the capacitors 34a and 34b. Specifically, the CPU module 14 determines whether the power shutdown detection signal is in the High state and whether the charge completion detection flag is in the High state at the reboot determination timing (determination timing). The reboot determination timing is performed, as shown in FIG. 3, for example, after a lapse of a period C from the start of the termination process. That is, the reboot determination timing is a timing after at least the backup process in the termination process has been executed. Therefore, it is possible to prevent the reboot process from being executed at an improper timing during the backup process, etc. with a sudden start of the reboot process and inability to store the data.

In FIG. 3, at the reboot determination timing, the power shutdown detection signal is in the High state, but the charge completion detection flag is in the Low state; therefore, the CPU module 14 does not execute the reboot process. That is, if the reboot process is executed at the reboot determination timing and the power shutdown occurs again, the power will be in shortage as the power amount necessary for the termination process is not charged in the capacitors 34a and 34b; therefore, the CPU module 14 does not execute the reboot process. In addition, the CPU module 14 may wait until the charge completion detection flag becomes the High state to perform the reboot determination again.

On the other hand, in FIG. 4, at the reboot determination timing, the power shutdown detection signal is in the High state, and the charge completion detection flag is in the High state; therefore, the CPU module 14 executes the reboot process. That is, even if the power shutdown occurs again when the reboot process is executed at the reboot determination timing, the power is sufficient as the power amount necessary for the termination process is charged in the capacitors 34a and 34b; therefore, the CPU module 14 can execute the reboot process.

[Regarding the Power Shutdown Process]

Figure 6:
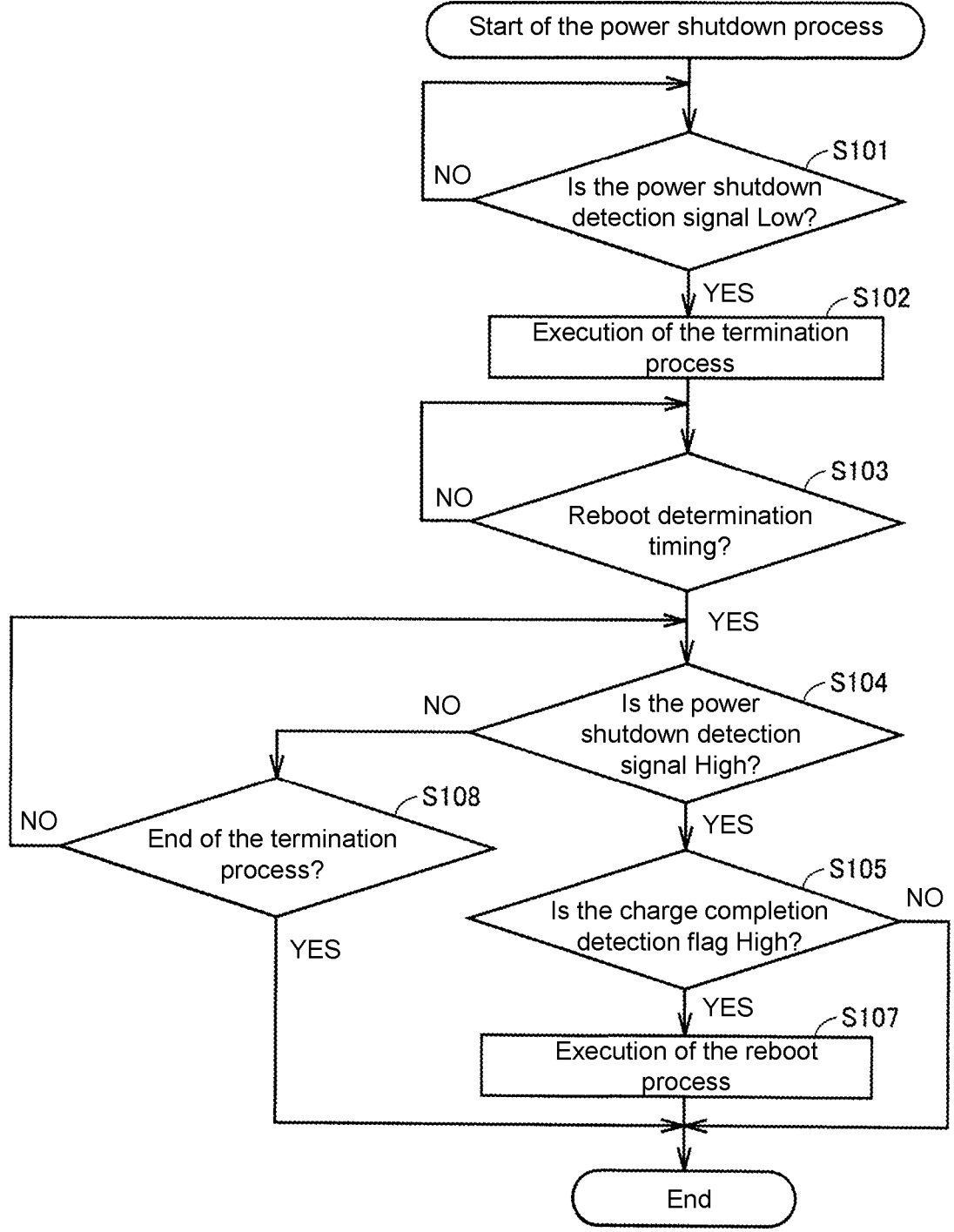
FIG. 6 is a flowchart for explaining the power shutdown process.

Next, the power shutdown process including the reboot determination described with reference to FIGS. 3 and 4 will be described with reference to a flowchart. FIG. 6 is a flowchart for explaining the power shutdown process. First, the CPU module 14 determines whether the power shutdown detection signal notified from the power shutdown detection part 17 is in the Low state (Step S101). In a case where the power shutdown detection signal is not in the Low state (NO in Step S101), the CPU module 14 determines that no power shutdown has occurred and returns the process to Step S101.

In a case where the power shutdown detection signal is in the Low state (YES in Step S101), the CPU module 14 determines that the power shutdown has occurred and starts executing the termination process by the power supply from the power supply holding circuit 41 (Step S102).

Next, the CPU module 14 determines whether the process timing is the reboot determination timing after the backup process included in the termination process has been executed (Step S103). In a case where it is not the reboot determination timing (NO in Step S103), the CPU module 14 determines that the backup process is in progress and returns the process to Step S103.

In a case where it is the reboot determination timing (YES in Step S103), the CPU module 14 determines whether the power shutdown detection signal notified from the power shutdown detection part 17 is in the High state as one condition of the reboot determination (Step S104). In a case where the power shutdown detection signal is in the High state (YES in Step S104), since the power supply has been returned, the CPU module 14 determines whether the charge completion detection flag is in the High state as the other condition of the reboot determination (Step S105).

If the charge completion detection flag is in the High state (YES in Step S105), the CPU module 14 determines that the capacitors 34a and 34b are charged with the power amount necessary for the termination process even if the power shutdown occurs again during the reboot process and executes the reboot process (Step S107). If the charge completion detection flag is not in the High state (No in Step S105), the CPU module 14 determines that the capacitors 34a and 34b are not charged with the power amount necessary for the termination process if the power shutdown occurs again during the reboot process and ends the process without executing the reboot process.

With reference back to Step S104, in a case where the power shutdown detection signal is not in the High state (NO in Step S104), the CPU module 14 determines whether the termination process has ended since the power supply has not been returned yet (Step S108). In a case where the termination process has not ended (NO in Step S108), the CPU module 14 returns the process to Step S104 in order to monitor whether the power supply is returned during the termination process. In a case where the termination process has ended (YES in Step S108), the CPU module 14 ends the process.

As described above, the PLC 10 according to the present embodiment includes the CPU module 14 for controlling the machines to be controlled, the power shutdown detection part 17 for detecting the power shutdown in which the power supply from the power supply unit 12 to the CPU module 14 is cut off, the power supply holding circuit 41 for supplying power to the CPU module 14 at the time of the power shutdown, and the power detection part 18 for detecting the power amount held in the power supply holding circuit 41. In a case where the power shutdown detection part 17 has detected the power shutdown, the CPU module 14 executes a termination process with the power supplied from the power supply holding circuit 41, and in a case where the power shutdown detection part 17 has detected the return of the power supply from the power shutdown, the CPU module 14 executes the reboot process on condition that the power supply holding circuit 41 holds the power amount equal to or greater than the reference amount based on the power detection part 18. Therefore, in the PLC 10, the termination process can be properly executed even in a case where the power shutdown occurs again during the reboot process.

The CPU module 14 may set the reboot determination timing for whether to execute the restart process after a lapse of a certain period of time from the start of the termination process and determine the return of the power supply from the power shutdown and the power amount of the power supply holding circuit 41 at the reboot determination timing. In this way, it is possible to prevent a situation where the reboot process is executed at an improper timing during the termination process.

The reboot determination timing is the timing after at least the backup process in the termination process has been executed. In this way, it is possible to avoid a situation where the reboot process is executed during the backup process and the data cannot be stored.

The reference amount may be set based on the power amount necessary for executing the termination process. In this way, even if the power shutdown occurs again when the reboot process is executed, the capacitors 34a and 34b are sufficiently charged with the power amount necessary for the termination process.

The control method of the PLC 10 according to the present embodiment includes the step of executing the termination process with the power supplied from the power supply holding circuit 41 in a case where the power shutdown detection part 17 has detected the power shutdown; and the step of executing the restart process on condition that the power supply holding circuit 41 holds the power amount equal to or greater than the reference amount based on the power detection part 18 in a case where the power shutdown detection part 17 has detected the return of the power supply from the power shutdown.

(Modified Example)

The configuration of the power supply holding circuit 41 including the DC/DC converter 33, the capacitors 34a and 34b, and the DC/DC converter 35 has been described. However, the disclosure is not limited thereto, and the power supply holding circuit 41 may employ a power storage configuration in addition to the capacitors as long as it can hold the power amount necessary for executing the termination process.

Although it has been described that the reference amount is set based on the power amount necessary for executing the termination process, a greater power amount in consideration of a margin, etc. may be set.

Although the reboot determination timing has been described as the timing after a lapse of a certain period of time from the start of the termination process and the timing after at least the backup process in the termination process has been executed, it may be any timing as long as it does not affect the termination process by executing the reboot process. Further, the reboot determination may be performed even in a case where the reboot process is executed after termination process.

The embodiments disclosed herein are exemplary and should not be construed restrictive in all aspects. The scope of the disclosure is defined by the claims instead of the above descriptions, and it is intended to include the equivalent of the scope of the claims and all modifications within the scope.

What is claimed is:

1. A control device, comprising:
   a controller configured to control machines to be controlled;
   a power shutdown detection circuit configured to detect a power shutdown in which power supply from a power supply to the controller is cut off;
   a power supply holding circuit configured to supply power to the controller at the time of the power shutdown; and
   a power detection circuit configured to detect a power amount held in the power supply holding circuit,
   wherein the controller
   executes a termination process with the power supplied from the power supply holding circuit in a case where the power shutdown detection circuit has detected the power shutdown; and
   executes a restart process on condition that the power supply holding circuit holds the power amount equal to or greater than a reference amount based on the power detection circuit in a case where the power shutdown detection circuit has detected a return of the power supply from the power shutdown, wherein the controller sets a determination timing for whether to execute the restart process after a lapse of a certain period of time from a start of the termination process and determines the return of the power supply from the power shutdown and the power amount of the power supply holding circuit at the determination timing.

2. The control device according to claim 1, wherein the determination timing is set as a timing after at least a backup process in the termination process has been executed.

3. The control device according to claim 1, wherein the reference amount is set based on a power amount necessary for executing the termination process.

4. The control device according to claim 2, wherein the reference amount is set based on a power amount necessary for executing the termination process.

5. A control method of a control device, the control device comprising:
- a controller configured to control machines to be controlled;
- a power shutdown detection circuit configured to detect a power shutdown in which power supply from a power supply to the controller is cut off;
- a power supply holding circuit configured to supply power to the controller at the time of the power shutdown; and
- a power detection circuit configured to detect a power amount held in the power supply holding circuit, the control method comprising:
- executing a termination process with the power supplied from the power supply holding circuit in a case where the power shutdown detection circuit has detected the power shutdown;
- executing a restart process on condition that the power supply holding circuit holds the power amount equal to or greater than a reference amount based on the power detection circuit in a case where the power shutdown detection circuit has detected a return of the power supply from the power shutdown;
- setting a determination timing for whether to execute the restart process after a se of a certain period of time from a start of the termination process; and
- determining the return of the power supply from the power shutdown and the power amount of the power supply holding circuit at the determination timing.

* * * * *